(12) United States Patent
Pesce et al.

(10) Patent No.: US 11,190,129 B2
(45) Date of Patent: Nov. 30, 2021

(54) PHOTOVOLTAIC MODULE CONNECTOR FOR SOLAR TRACKER

(71) Applicant: Tesla, Inc., Palo Alto, CA (US)

(72) Inventors: Kathryn Austin Pesce, San Francisco, CA (US); Charles Bernardo Almy, Berkeley, CA (US)

(73) Assignee: Tesla, Inc., Palo Alto, CA (US)

( * ) Notice: Subject to any disclaimer, the term of this patent is extended or adjusted under 35 U.S.C. 154(b) by 437 days.

(21) Appl. No.: 15/092,602

(22) Filed: Apr. 6, 2016

(65) Prior Publication Data

US 2017/0294869 A1    Oct. 12, 2017

(51) Int. Cl.
*H02S 20/32*     (2014.01)
*F24S 25/63*     (2018.01)
*F24S 30/425*    (2018.01)

(52) U.S. Cl.
CPC .............. *H02S 20/32* (2014.12); *F24S 25/63* (2018.05); *F24S 30/425* (2018.05); *Y02E 10/47* (2013.01)

(58) Field of Classification Search
CPC ........... H02S 20/32; H02S 20/30; H02S 30/10
USPC .................................................. 136/243–265
See application file for complete search history.

(56) References Cited

U.S. PATENT DOCUMENTS

| | | |
|---|---|---|
| 4,498,822 A | 2/1985 | Diba |
| 6,809,251 B2 | 10/2004 | Dinwoodie |
| 7,647,924 B2 | 1/2010 | Hayden |
| 7,832,157 B2 | 11/2010 | Cinnamon |
| 8,109,393 B2 | 2/2012 | Haeberlein |
| 8,371,076 B2 | 2/2013 | Jones et al. |
| 8,567,134 B1 | 10/2013 | Grushkowitz et al. |
| 8,650,813 B2 | 2/2014 | Botkin et al. |
| 8,757,567 B2 | 6/2014 | Ciasulli et al. |
| 8,813,460 B2 | 8/2014 | Cinnamon et al. |
| 8,822,812 B2 | 9/2014 | Wares |
| 8,839,784 B2 | 9/2014 | Wares et al. |
| 8,881,415 B2 | 11/2014 | Barton |
| 8,887,920 B2 | 11/2014 | Pelman et al. |
| 9,172,325 B2 | 10/2015 | Klinga et al. |
| 9,184,324 B2 | 11/2015 | Wares et al. |
| 9,263,985 B2 | 2/2016 | Silberschatz et al. |
| 9,281,778 B2 | 3/2016 | Corio et al. |
| 2004/0140002 A1 | 7/2004 | Brown et al. |
| 2006/0005875 A1 | 1/2006 | Haberlein |

(Continued)

FOREIGN PATENT DOCUMENTS

| | | |
|---|---|---|
| CN | 201000241 Y | 1/2008 |
| DE | 19601069 A1 | 4/1997 |

(Continued)

*Primary Examiner* — Dustin Q Dam
(74) *Attorney, Agent, or Firm* — Dentons US LLP

(57) ABSTRACT

Photovoltaic modules are mounted onto a solar tracker array torque tube via pairs or left-handed and right-handed photovoltaic array connectors or brackets. The left-handed and right-handed photovoltaic array connectors have orientation projections that couple with and extend into the interior body of the torque tube. Pairs of left-handed photovoltaic array connectors and pairs of right-handed photovoltaic array connectors of adjacent photovoltaic modules can further be fastened together, thereby securing the photovoltaic modules to the torque tube and distributing the load of the overall number of photovoltaic modules mounted on the solar tracker array.

10 Claims, 8 Drawing Sheets

(56) References Cited

U.S. PATENT DOCUMENTS

| | | |
|---|---|---|
| 2010/0089390 A1 | 4/2010 | Miros et al. |
| 2010/0313499 A1 | 12/2010 | Gangemi |
| 2011/0265860 A1* | 11/2011 | Ciasulli .................. F24S 25/65 136/251 |
| 2011/0290307 A1 | 12/2011 | Workman et al. |
| 2012/0180845 A1* | 7/2012 | Cole ....................... H02S 20/20 136/246 |
| 2012/0233940 A1 | 9/2012 | Perkins et al. |
| 2014/0246549 A1* | 9/2014 | West ....................... H02S 20/30 248/220.22 |
| 2014/0261626 A1 | 9/2014 | Ripoll Agullo |
| 2014/0270930 A1 | 9/2014 | Grushkowitz |
| 2014/0318605 A1 | 10/2014 | Huzyak et al. |
| 2014/0360552 A1 | 12/2014 | Britcher et al. |
| 2015/0101996 A1 | 4/2015 | Nayar |
| 2015/0104239 A1 | 4/2015 | Schaefer et al. |

FOREIGN PATENT DOCUMENTS

| | | | |
|---|---|---|---|
| DE | 29908190 U1 | 8/1999 | |
| DE | 10336145 A1 | 3/2005 | |
| DE | 102004049595 B3 | 3/2006 | |
| DE | 102010005194 A1 | 9/2010 | |
| DE | 102012202256 A1 | 5/2013 | |
| DE | 202013005668 U1 | 10/2014 | |
| EP | 2549198 B1 | 12/2013 | |
| JP | 2006278738 A * | 10/2006 | ............ F24S 25/617 |
| JP | 2006278738 A | 10/2006 | |
| WO | 2015024542 A1 | 2/2015 | |

\* cited by examiner

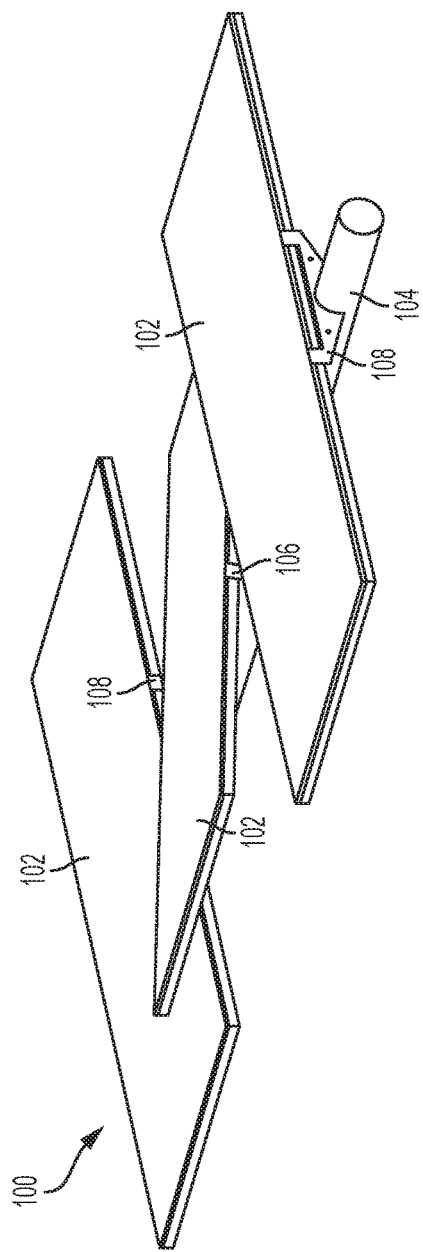
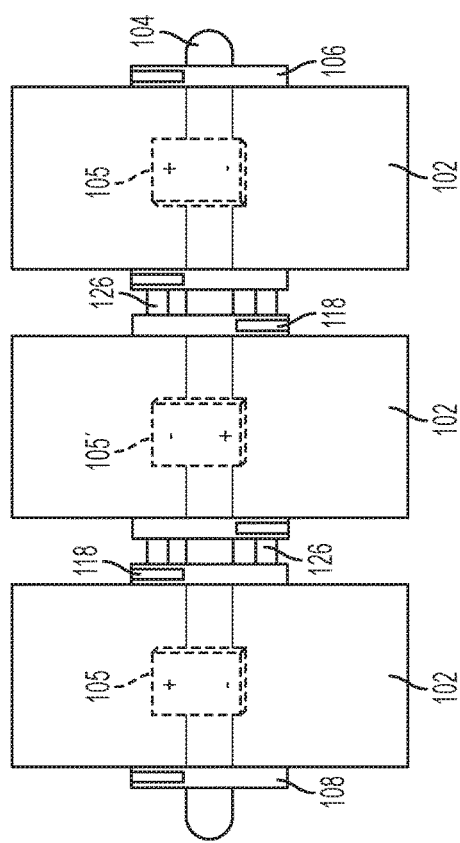
FIG. 1A
FIG. 1B

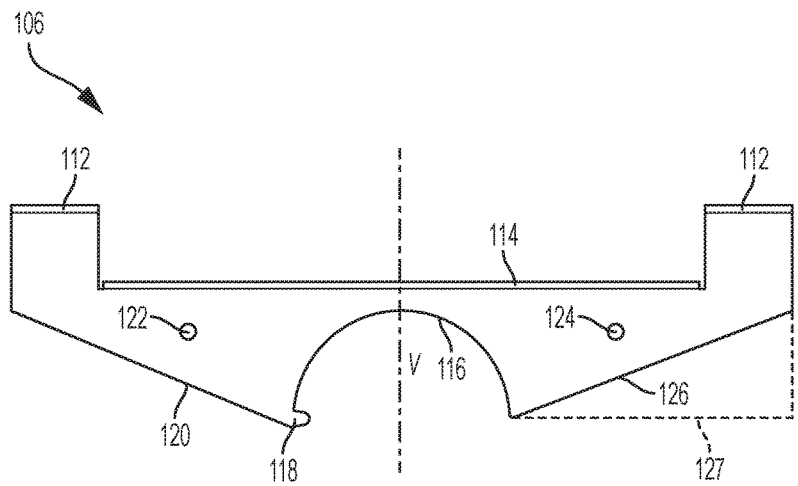
FIG. 2A
FIG. 2B
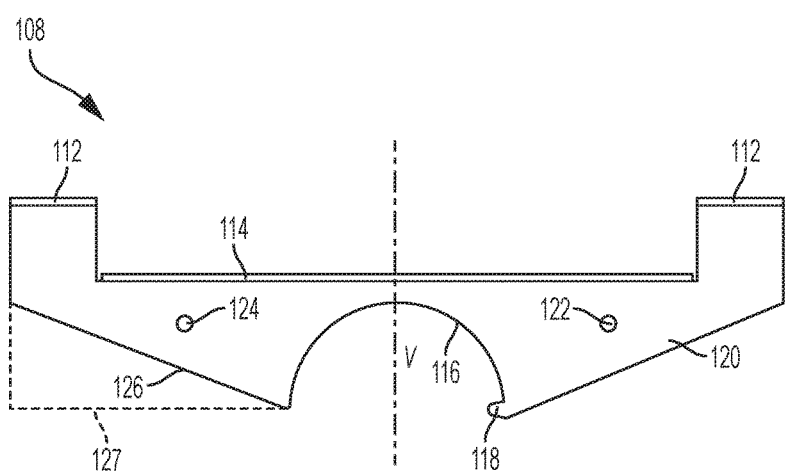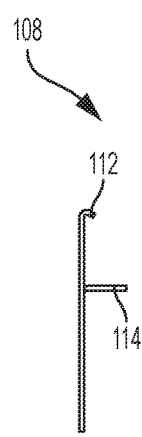
FIG. 2C
FIG. 2D

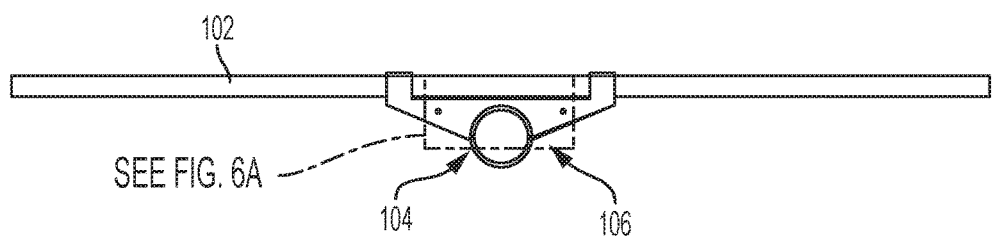
FIG. 6
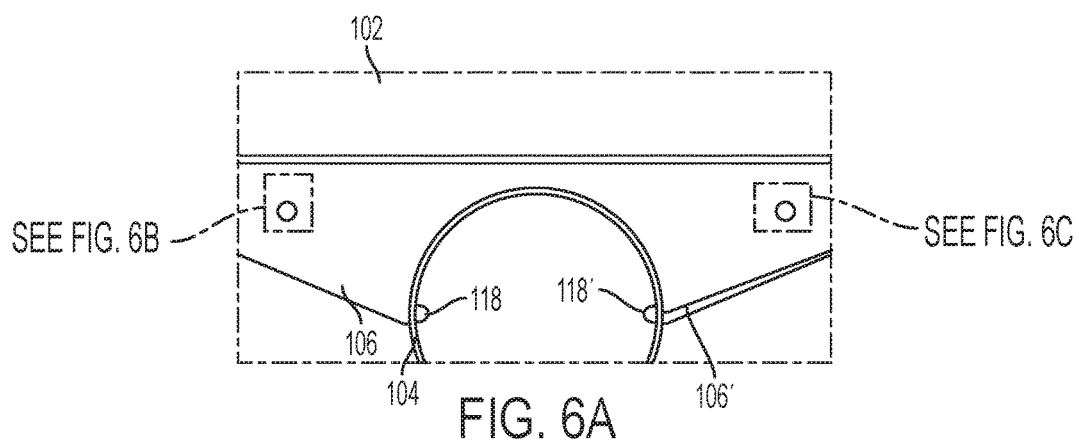
FIG. 6A
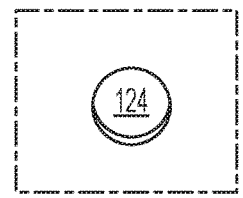 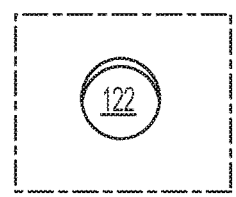
FIG. 6B    FIG. 6C

_US 11,190,129 B2_

PHOTOVOLTAIC MODULE CONNECTOR FOR SOLAR TRACKER

TECHNICAL FIELD

The present invention relates to photovoltaic modules and photovoltaic tracker arrays assembled therefrom.

BACKGROUND OF THE INVENTION

Solar trackers are used to rotate photovoltaic (PV) modules to keep them perpendicular to the direct rays of the sun. Keeping the PV modules, as part of an array, at this orientation increases or optimizes the amount of energy that can be generated by the array, because energy generated by the array drops off with the cosine of the angle of incidence of solar rays on the surface of the array. Because they are usually ground mounted and require row-to-row spacing, trackers are typically used in medium to large sized arrays (e.g., >=1 megawatt). Although trackers add an additional cost per watt over fixed ground-mount systems, the cost is typically recouped on larger arrays.

In a single-axis tracker, photovoltaic modules are suspended above the ground in one or more horizontal rows, connected to a beam known as a torque tube. The torque tube, generally oriented along a North-South axis, is attached to a drive mechanism actuated by a controller to incrementally rotate the photovoltaic array in place over the course of the day to maintain a relatively constant angle with the sun as the sun progresses through the sky.

Some more sophisticated trackers known as dual-axis trackers not only rotate modules from East-to-West but also tilt modules towards the equator. With these trackers, modules are usually clustered together in individual sections, spaced apart from one another since they have to have greater spacing due to intra-row shading (shading of one section by an adjacent section in the same row), as well as inter-row shading (shading of one row by the adjacent row).

Because tracker arrays require very little post installation maintenance, the viability of these projects often turns on the projected rate of return derived from comparing the fixed value of the energy generated over the lifetime of the system versus the upfront costs of installation. In a multi-megawatt project, cost reductions of pennies per watt can be the difference between a project being viable or too expensive. Therefore, tracker designers are always seeking innovations to lower installation and hardware costs.

Accordingly, there remains a need for photovoltaic module assembly hardware that can make installation of solar tracker arrays more efficient and cost effective.

BRIEF SUMMARY OF THE INVENTION

In various aspects, the present disclosure provides for: photovoltaic module connectors or brackets; a section of a photovoltaic array having photovoltaic modules mounted onto a torque tube, with each photovoltaic module having a pair of photovoltaic module connectors on opposing sides of the photovoltaic module, through which the photovoltaic module mounts onto the torque tube; and a method of assembling a section of a photovoltaic tracker array.

In some embodiments, the photovoltaic module connectors are provided as paired sets, with left-handed and right-handed versions of the photovoltaic module connectors configured to connect to a photovoltaic module on opposing sides of the photovoltaic module. The photovoltaic module connectors are further configured to have apertures for receiving fasteners or rivets, such that between two adjacent photovoltaic modules, a right-handed photovoltaic module connector for a first photovoltaic module can be physically connected to the right-handed photovoltaic module connector of a first adjacent photovoltaic module, and a left-handed photovoltaic module connector for the first photovoltaic module can be physically connected to the left-handed photovoltaic module connector a second adjacent photovoltaic module on the opposite side of the first photovoltaic module. The physical connection of photovoltaic module connectors distributes the weight and load of both photovoltaic modules across the torque tube and reduces the shear force on any one set of photovoltaic module connectors.

Various embodiments of the invention provide new and improved methods and systems for attaching solar panels to a torque tube of a solar tracker. Various embodiments will reduce costs and increase installation speed over conventional methods and systems. These and other embodiments are shown and discussed in greater detail in the drawing figures and corresponding detailed description.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 1A shows a section of a photovoltaic array with photovoltaic modules mounted to a torque tube with photovoltaic module connectors according to embodiments of the disclosure.

FIG. 1B shows a schematic plan view representation of a section of a photovoltaic array with photovoltaic modules mounted to a torque tube with photovoltaic module connectors, according to embodiments of the disclosure.

FIG. 2A shows a profile view of a right-handed photovoltaic module connector, according to aspects of the disclosure.

FIG. 2B shows a side view of a right-handed photovoltaic module connector, according to aspects of the disclosure.

FIG. 2C shows a profile view of a left-handed photovoltaic module connector, according to aspects of the disclosure.

FIG. 2D shows a side view of a left-handed photovoltaic module connector, according to aspects of the disclosure.

FIG. 6 shows a profile view of a photovoltaic module connector coupled to a photovoltaic module, according to embodiments of the disclosure.

FIG. 6A shows a detail section of the photovoltaic module connector of FIG. 6, according to embodiments of the disclosure.

FIG. 6B shows a further detail section of a first aperture of the photovoltaic module connector of FIG. 6, according to embodiments of the disclosure.

FIG. 6C shows a further detail section of a second aperture of the photovoltaic module connector of FIG. 6, according to embodiments of the disclosure.

DETAILED DESCRIPTION OF THE INVENTION

Figure 3:
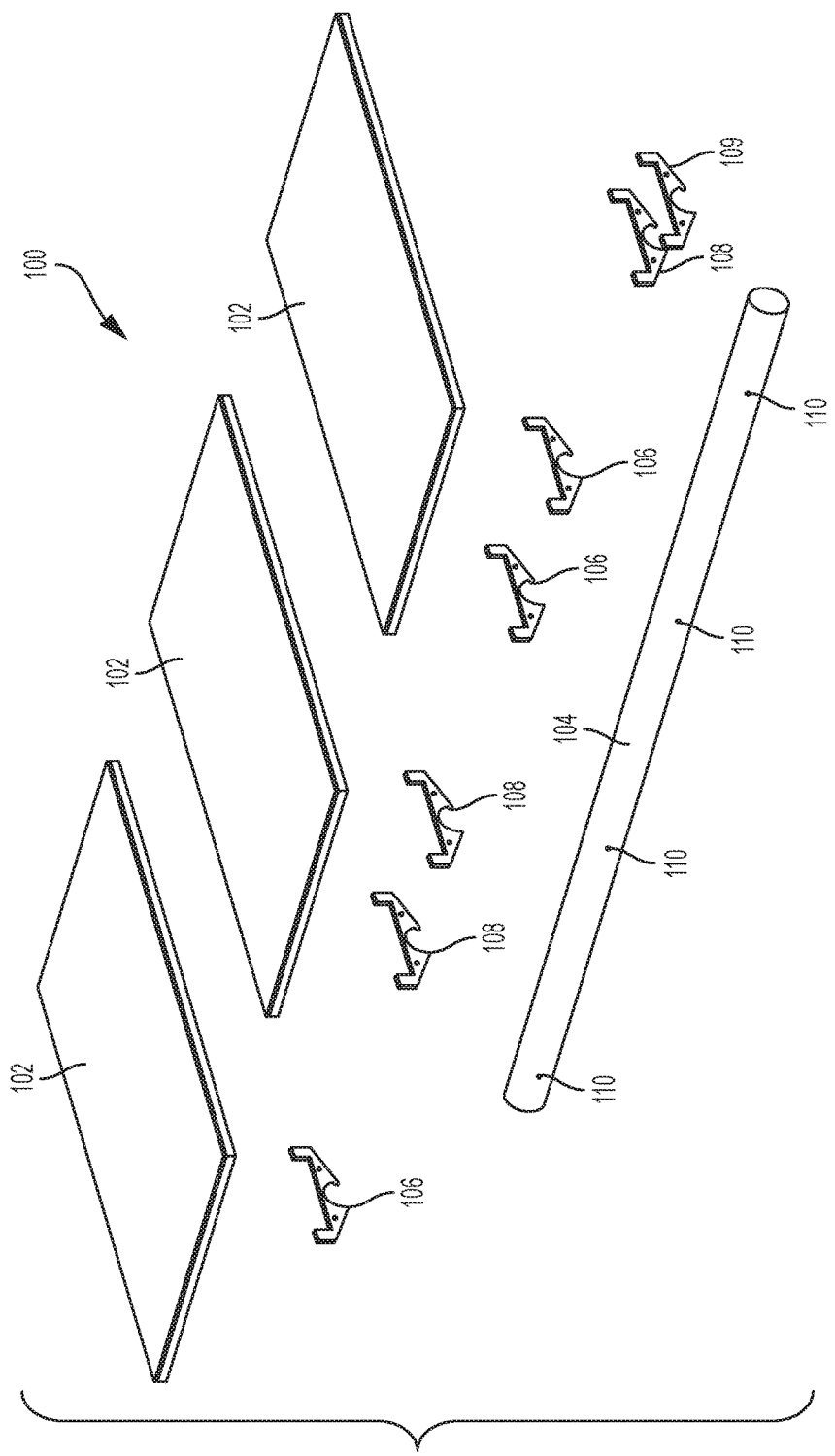
FIG. 3 shows an exploded view of FIG. 1A, showing photovoltaic modules, photovoltaic module connectors, and a torque tube, according to embodiments of the disclosure.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Solar arrays that track the daily movement of the sun typically consist of one or more rows of photovoltaic (PV) modules (e.g., solar panels) that are attached to contiguous sections of pipe, referred to singularly or collectively as a torque tube. Spacing between rows is necessary to allow the modules to freely rotate and also to prevent inter-row shading (e.g., row-to-row shading). A drive motor then rotates the torque tube in accordance with a predetermined algorithm to keep the solar panels attached to the tube "on sun"—in other words, relatively perpendicular to direct solar radiation. This algorithm will vary depending on the latitude of the installation. These types of solar trackers are referred to single axis trackers. There may be a drive motor on each torque tube, or alternatively a common drive assembly that interconnects multiple torque tubes to rotate them simultaneously.

Mounting photovoltaic modules to torque tubes of solar tracker arrays can be time consuming and require specialized or heavy equipment. The present disclosure contemplates a system and set of photovoltaic modules that allows for attaching rivets between connective structures of the photovoltaic modules without the need for a powered hydraulic riveter. Moreover, the connection of the present disclosure does not involve blind riveting into a torque tube, but rather a fastening or riveting that can be accomplished by a hand tool or with a powered (non-hydraulic) riveter.

Earlier approaches to mounting photovoltaic modules to a torque tube by use of tab or projection structures alone led to problems with both excessive shear force on the extended structures, and problems with the sharing of holes by more than one module, creating physical conflicts. As seen herein, alternating the attachment orientation of photovoltaic modules and their respective tab or projection structures distributes the load and sheer force on either side of the torque tube and avoids physical conflict zones.

As further seen herein, photovoltaic modules connectors, and the attachment tabs of those photovoltaic modules connectors fit into holes of a torque tube, exert an restoring spring-like force when fit and stretched over the exterior surface of a torque tube. By pairing photovoltaic modules connectors, with respective attachment tabs in receiving holes of opposite sides of a torque tube, the restoring forces and tension created by the photovoltaic modules connectors is offset and balanced, stabilizing the photovoltaic modules mounted as part of an array.

As used herein, the terms "right-hand" and "left-hand" refer to the orientation of two PV module connectors that are attached to one another to form a connection system between two PV modules. Generally, a right-handed connector connects to one side of a first PV module, while a left-handed connector connects to the opposing side of the same PV module. The right and left handed connectors are not necessarily identical or interchangeable, but can have many mirrored elements. This naming convention is for ease of reference, as it can be understood that the order in which PV modules are assembled or mounted, or the decision to identify one end of a PV module as the top, head, or leading end versus another, is contextual.

FIG. 1A shows photovoltaic array section 100 having photovoltaic modules 102 mounted to torque tube 104 with PV module connectors. In particular, FIG. 1A shows photovoltaic array section 100 at an intermediate stage of assembly and installation, where photovoltaic modules 102 are not yet settled into a substantially even and uniform plane. Torque tube 104 (alternatively referred to as a pipe) has a circular shape. In other embodiments, torque tube 104 can have a square, rectangular, triangular, hexagonal, octagonal, or other cross-sectional shape. Photovoltaic modules 102 are generally rectangular, having a long edge and a short edge, and as considered herein, photovoltaic modules 102 can be rectangular modules as known in the industry, including but not limited to, 60-cell PV modules, 72-cell PV modules, 80-cell PV modules, 96-cell PV modules, and the like. Generally, for any given photovoltaic array section 100, photovoltaic modules 102 will be the same size, operate at the same voltage, and generate the same amount of power, such that no individual photovoltaic module 102 of photovoltaic array section 100 becomes an operational drag on the other photovoltaic modules 102.

Photovoltaic modules 102 are each secured to torque tube 104 via PV module connectors, in particular right-handed PV module connectors 106 and left-hand module connectors 108. Both right-handed PV module connectors 106 and left-hand module connectors 108 mechanically attached to opposing long edges of photovoltaic modules 102. Further, both right-handed PV module connectors 106 and left-hand module connectors 108 are shaped to have a cut-out region that can mechanically match with and couple to an exterior profile and shape of torque tube 104. Right-handed PV module connector 106 and left-hand module connector 108 allow for photovoltaic module 102 to balance on and secure to torque tube 104. Moreover, both of right-handed PV module connector 106 and left-hand module connector 108 have an inward surface, configured to face and connect to photovoltaic modules 102, and an outward surface on the opposite side from the respective inward surface.

FIG. 1B shows a schematic plan view representation of photovoltaic array section 100 having photovoltaic modules 102 mounted to torque tube 104. Shown further are right-hand PV module connector 106 and left-hand PV module connector 108 one either side of each photovoltaic module 102. As seen in FIGS. 1A and 1B, in various embodiments, photovoltaic modules 102 may be installed in a staggered basis so that every other photovoltaic module 102 is installed from one side of the torque tube (e.g., set down on so that PV module connectors 106, 108 engage torque tube 104) while every other remaining photovoltaic module 102 is installed from the other side of torque tube 104 in the same manner. Accordingly, between directly adjacent first and second photovoltaic modules 102, left-handed module connector 108 will be proximate to left-handed module connector 108 of the next module while right-handed module connector 106 will always sit proximate to right handed module connector 106 of the directly adjacent photovoltaic module 102. Such proximate right-handed PV module connectors 106 and left-hand PV module connectors 108 can be connected to corresponding respective PV module connectors 106, 108 of the next adjacent photovoltaic module 102 with rivets 128. Connecting proximate right-handed PV module connectors 106 to adjacent, oppositely oriented right-handed module connector 106 and left-hand PV module connectors 108 with adjacent, oppositely oriented left-handed PV module connector 108 with rivets 128 provides for stability and structure to photovoltaic array section 100.

Both right-handed PV module connectors 106 and left-hand module connectors 108 can further include alignment projections 118 (alternatively referred to as orientation projections, hooks, or tabs) that provide for structural elements that can couple with holes in torque tube 104, thereby stabilizing photovoltaic modules 102 mounted to torque tube 104 via right-hand PV module connector 106 and left-hand PV module connector 108.

As part of photovoltaic array section 100, photovoltaic modules 102 need junction boxes 105, 105' connected to the cells of each photovoltaic module 102 to relay the solar energy collected by the photovoltaic cells. Typically, modules 102 are strung together in series with the V− connector of a first module junction box 105 connected to the V+ connector of a second module junction box 105'. As shown in FIG. 1B, although photovoltaic modules 102 are identical, the orientation of alternating photovoltaic modules 102 along torque tube 104 could risk uniformly oriented primary junction boxes 105 to have relatively complicated wring paths. Accordingly, first junction boxes 105 and secondary junction boxes 105' can be electrically connected to photovoltaic modules 102 as appropriate along the length of torque tube 104, such that the polarity or orientation of both primary junction boxes 105 and secondary junction boxes 105' are aligned to be efficiently wired and conduct electricity. (It can be further understood that identification of primary junction boxes 105 and secondary junction boxes 105' is used as a term of convenience for differentiating between junction boxes as attached to photovoltaic modules 102 of opposite orientations, and not as an indication of primacy for junction boxes.)

Both right-handed PV module connectors 106 and left-hand module connectors 108 can be constructed from materials appropriate for use with photovoltaic array section 100 and photovoltaic modules 102. Accordingly, right-handed PV module connectors 106 and left-hand PV module connectors 108 can be constructed from lightweight construction materials including, but not limited to, stainless steel, aluminum, titanium, other metals, and alloys or intermetallics thereof. In various embodiments, both right-handed PV module connectors 106 and left-hand PV module connectors 108 can each be formed out of a single piece of sheet metal that is stamped and bent into the appropriate shape. In alternative embodiments, right-handed PV module connectors 106 and left-hand PV module connectors 108 can also be fabricated from roll-formed metal, casting, or other such process. Both right-handed PV module connectors 106 and left-hand PV module connectors 108 can be designed and constructed to withstand upwards of 305 lbs. of upforce (e.g. from torque tube 104) and 375 lbs. of downforce (e.g. from photovoltaic module 102).

FIG. 2A shows a profile view of right-handed PV module connector 106, which can be referred to as a "saddle bracket", has a main body constructed to couple with and conform to components of photovoltaic array section 100. Right-handed PV module connector 106 includes clamping curve sections 112 and ledge section 114 that extend from the inward surface of right-handed PV module connector 106. Clamping curve sections 112 can be located at opposite ends of right-handed PV module connector 106 with ledge section 114 in between. Ledge section 114 can be alternatively referred to as a platform, a lateral support, or an inward support member. Also, though shown as a continuous ledge in the figures, it should be appreciated that ledge section 114 may consist of two or more non-contiguous ledge sections. Clamping curve sections 112 can be relatively higher than ledge section 114 along the height of right-handed PV module connector 106. In alternative aspects, clamping curve sections 112 can be located more proximate toward the center of the length of right-handed PV module connector 106, and right-handed PV module connector 106 can include a plurality of ledge sections 114 on one or either side of clamping curve sections 112.

Below ledge section 114, formed in the main body of right-handed PV module connector 106, is collar edge 116. Collar edge 116 can be cut, cast, or otherwise formed into the main body of right-handed PV module connector 106 to match with the shape of the exterior surface of torque tube 104. For example, where torque tube 104 is circular (forming a cylinder), collar edge 116 can have a semi-circular shape. The shape of collar edge 116 of any given PV module connector can correspond to the shape of torque tube 104. One end of collar edge 116 can have alignment projection 118, where alignment projection 118 is arranged to extend relatively toward a central vertical axis V of right-handed PV module connector 106, or in other words, toward the opposite end of collar edge 116.

Alignment projection 118 can be angled to point relatively toward, parallel to, or away from ledge section 114. Further, alignment projection 118 can extend a distance from the main body of right-handed PV module connector 106 about one quarter of an inch (¼ in.), or about less than or equal to five percent (≤5%) of the width or diameter of collar edge 116. Alignment projection 118 can be formed from the main body of right-handed PV module connector 106, being made of the same material. Alignment projection 118 can further be a reinforced structure, where in some aspects alignment projection 118 can be about twice as thick as the remainder of the main body of right-handed PV module connector 106. The thickness of alignment projection 118 can be increased by adding material to the width of alignment projection 118 relative to the main body of right-handed PV module connector 106, for example by doubling the amount of metal and/or alloy used for alignment projection 118, and thereby proportionally increasing the strength of alignment projection 118 relative to the main body of right-handed PV module connector 106. In alternative aspects, the structure of alignment projection 118 can be reinforced with an additional amount of material attached (e.g. welded) onto the main body of right-handed PV module connector 106, where the additional material can be the same or a different metal or alloy as right-handed PV module connector. Alignment projection 118 can be configured to couple with receiving holes in torque tube 104, discussed in further detail below.

Right-handed PV module connector 106 can further include leading edge ramp 120, defining a lower edge of the main body of right-handed PV module connector 106, on the same side as alignment projection 118 relative to collar edge 116. In some aspects, leading edge ramp 120 is contiguous with alignment projection 118, such that the edge of leading edge ramp 120 leads into alignment projection 118 extending inward toward collar edge 116. The main body of right-handed PV module connector 106 can further include leading aperture 122 generally above leading edge ramp 120, where leading aperture 122 can be sized and shaped to receive rivet 128. Similarly, the main body of right-handed PV module connector 106 can further include trailing aperture 124 generally above trailing edge ramp 126, where trailing aperture 124 can also be sized and shaped to receive rivet 128.

The length of right-handed PV module connector 106, in some embodiments, can be from about two hundred millimeters to about one thousand millimeters (200 mm-1000 mm), or a length of any increment or gradient thereof. The length of right-handed PV module connector 106, in some particular embodiments, can be about four hundred millimeters (400 mm).

Each of leading edge ramp 120 and trailing edge ramp 126 can have an angle relative to ledge section 114 (or in other words, relative to the horizontal plane on which photovoltaic module 102 rests when coupled to right-handed PV module connector 106) that is from about five degrees to about sixty degrees ($\theta=5°-60°$). This angle for either of leading edge ramp 120 or trailing edge ramp 126 can be in part determined by the length of right-handed PV module connector 106, and can further in part be determined by the amount of structural support needed for various photovoltaic modules 102 (e.g. photovoltaic modules 102 having different numbers of photovoltaic cells, weights, and/or lengths). Further, in some embodiments, trailing edge ramp 126 does not necessarily need to have a particular angle relative to ledge section 114, but rather can be squared-off section 127 of right-handed PV module connector 106, or in other words, the section of right-handed PV module connector 106 below trailing aperture 124 can be rectangular in shape (represented as an example, as a dotted line).

FIG. 2B shows a side view of right-handed PV module connector 106. The extent to which clamping curve 112 and ledge section 114 generally extend from the inward surface of right-handed PV module connector 106 can be further appreciated in FIG. 2B. In various aspects of right-handed PV module connector 106, either of clamping curve 112 and ledge section 114 can extend from about one inch to about twelve inches (1 in.-12 in.) from the inward surface of right-handed PV module connector 106, or a length of any increment or gradient thereof.

FIG. 2C shows a profile view of left-handed PV module connector 108 which, similarly to right-handed PV module connector 106, can have a "saddle bracket" shape, and has a main body constructed to couple with and conform to components of photovoltaic array section 100. Left-handed PV module connector 108 includes clamping curve 112 sections and ledge section 114 that extend from the inward surface of left-handed PV module connector 108. Clamping curve sections 112 can be located at opposite ends of left-handed PV module connector 108 with ledge section 114 in between. Clamping curve sections 112 can be relatively higher than ledge section 114 along the height of left-handed PV module connector 108. In alternative aspects, clamping curve sections 112 can be located more proximate toward the center of the length of left-handed PV module connector 108, and left-handed PV module connector 108 can include a plurality of ledge sections 114 on one or either side of clamping curve sections 112. Further, for any given photovoltaic module 102, right-handed PV module connector 106 and left-handed PV module connector 108 mechanically coupled to photovoltaic module 102 can have clamping curves 112 and ledges 114 that mirror each other (having the same number and arrangement of clamping curves 112 and ledges 114) on opposing sides of photovoltaic module 102.

Below ledge section 114, formed in the main body of left-handed PV module connector 108, is collar edge 116. Collar edge 116 can be cut, cast, or otherwise formed into the main body of left-handed PV module connector 108 to match with the shape of the exterior surface of torque tube 104, and accordingly can have the same shape as collar edge 116 of right-handed PV module connector 106. One end of collar edge 116 can have alignment projection 118, where alignment projection 118 is arranged to extend relatively toward a central vertical axis V of left-handed PV module connector 108, or in other words, toward the opposite end of collar edge 116.

Similar to right-handed PV module connector 106, alignment projection 118 of left-handed PV module connector 108 can be angled to point relatively toward, parallel to, or away from ledge section 114. Alignment projection 118 can extend a distance from the main body of left-handed PV module connector 108 about one quarter of an inch (¼ in.), or about less than or equal to five percent (≤5%) of the width or diameter of collar edge 116. Alignment projection 118 can be formed from the main body of left-handed PV module connector 108, being made of the same material. Alignment projection 118 can further be a reinforced structure, where in some aspects alignment projection 118 can be about twice as thick as the remainder of the main body of left-handed PV module connector 108. The thickness of alignment projection 118 can be increased by adding material to the width of alignment projection 118 relative to the main body of left-handed PV module connector 108, for example by doubling the amount of metal and/or alloy used for alignment projection 118, and thereby proportionally increasing the strength of alignment projection 118 relative to the main body of left-handed PV module connector 108. In alternative aspects, the structure of alignment projection 118 can be reinforced with an additional amount of material attached (e.g. welded) onto the main body of left-handed PV module connector 108, where the additional material can be the same or a different metal or alloy as right-handed PV module connector. Further, alignment projection 118 can be configured to couple with receiving holes in torque tube 104. In various aspects, alignment projections 118 on right-handed PV module connectors 106 and left-handed PV module connectors 108 can be of the same or different construction and/or thicknesses.

Again mirroring right-handed PV module connector 106, left-handed PV module connector 108 can further include leading edge ramp 120, defining a lower edge of the main body of left-handed PV module connector 108, on the same side as alignment projection 118 relative to collar edge 116. Also, in some aspects, leading edge ramp 120 is contiguous with alignment projection 118, such that the edge of leading edge ramp 120 leads into alignment projection 118 extending inward toward collar edge 116. The main body of left-handed PV module connector 108 can further include leading aperture 122 generally above leading edge ramp 120, where leading aperture 122 can be sized and shaped to receive rivet 128. The main body of left-handed PV module connector 108 can further include trailing aperture 124 generally above trailing edge ramp 126, where trailing aperture 124 can also be sized and shaped to receive rivet 128.

The length of left-handed PV module connector 108, in some embodiments, can be from about two hundred millimeters to about one thousand millimeters (200 mm-1000 mm), or a length of any increment or gradient thereof. The length of right-handed PV module connector 106, in some particular embodiments, can be about four hundred millimeters (400 mm). In various embodiments, right-handed PV module connectors 106 and left-handed PV module connectors 108 can be of the same or different lengths on any given photovoltaic module 102, or plurality of photovoltaic modules 102 as part of photovoltaic array section 100.

Each of leading edge ramp 120 and trailing edge ramp 126 can have an angle relative to ledge section 114 (or in other words, relative to the horizontal plane on which photovoltaic module 102 rests when coupled to left-handed PV module connector 108) that is from about five degrees to about sixty degrees ($\theta = 5°$-$60°$). This angle for either of leading edge ramp 120 or trailing edge ramp 126 can be in part determined by the length of left-handed PV module connector 108, and can further in part be determined by the amount of structural support needed for various photovoltaic modules 102 (e.g. photovoltaic modules 102 having different numbers of photovoltaic cells, weights, and/or lengths). Further, in some embodiments, trailing edge ramp 126 does not necessarily need to have a particular angle relative to ledge section 114, but rather can be a squared-off section of left-handed PV module connector 108, or in other words, the section of left-handed PV module connector 108 below trailing aperture 124 can be rectangular in shape. In some embodiments of photovoltaic module 102 connected to torque tube 104 as part of photovoltaic array section 100, either one of right-handed PV module connector 106 and left-handed PV module connector 108 can have trailing edge ramp 126 as an angled ramp while trailing edge ramp 126 of the other PV module connector can have a rectangular structure such as squared-off section 127 in lieu of trailing edge ramp 126.

FIG. 2D shows a side view of left-handed PV module connector 108. The extent to which clamping curve 112 and ledge section 114 generally extend from the inward surface of right-handed PV module connector 108 can be further appreciated in FIG. 2D. In various aspects of left-handed PV module connector 108, either of clamping curve 112 or ledge section 114 can extend from about one inch to about twelve inches (1 in.-12 in.) from the inward surface of left-handed PV module connector 108, or a length of any increment or gradient thereof. Further, for any given photovoltaic module 102, right-handed PV module connector 106 and left-handed PV module connector 108 mechanically coupled to photovoltaic module 102 can have clamping curves 112 and ledge sections 114 that extend an equal distance inward toward the center of photovoltaic module 102.

Considered in combination, right-handed PV module connectors 106 and left-handed PV module connectors 108 have opposing ledge sections 114 configured to support the frame of photovoltaic module 102 from below. Both right-handed PV module connectors 106 and left-handed PV module connectors 108 also have attachment projections 118 that, when right-handed PV module connectors 106 and left-handed PV module connectors 108 are attached to photovoltaic module 102, operate as a pair of attachment projections 118 that serve to bias and in part balance the frame of photovoltaic module 102 on one side of torque tube 104.

FIG. 3 shows an exploded view of photovoltaic array section 100 from FIG. 1A, further showing photovoltaic modules 102, right-handed PV module connectors 106, left-handed PV module connectors 108, and torque tube 104. Torque tube 104 has receiving holes 110 along the length of torque tube 104, positioned laterally proximate to the horizontal axis of symmetry of torque tube 104, and on both (opposing) sides of torque tube 104. In particular, components of photovoltaic array section 100 are shown as three subsets of photovoltaic array section 100 to more precisely show sequential assemblies of photovoltaic modules 102 with right-handed PV module connector 106 and left-handed PV module connector 108. Specifically, two photovoltaic modules 102 on the outer ends of torque tube 104 are shown with right-handed PV module connectors 106 and left-handed PV module connectors 108 both positioned above end sections of torque tube 104 such that alignment projections 118 of right-handed PV module connectors 106 and left-handed PV module connectors 108 can insert, fit, or hook into receiving holes 110 on the proximate side of torque tube 104. Photovoltaic module 102 in the middle position along torque tube 104 is shown with left-handed PV module connector 108 and right-handed PV module connector 106 positioned above a middle section of torque tube 104, such that alignment projections 118 of left-handed PV module connector 108 and right-handed PV module connector 106 can align with and insert, fit, or hook into receiving holes 110 on a distal side of torque tube 104.

Accordingly, in an exemplary embodiment, an installer can mount fully assembled photovoltaic module 102 (i.e. photovoltaic module 102 with both right-handed PV module connector 106 and left-handed PV module connector 108 mechanically attached thereto) on one end of torque tube 104 from the distal side of torque tube 104, sliding fully assembled photovoltaic module 102 along leading edge ramps 120 of right-handed PV module connector 106 and left-handed PV module connector 108 up onto torque tube 104 such that collar edges 116 of both right-handed PV module connector 106 and left-handed PV module connector 108 wrap around and settle on torque tube 104. Alignment projections 118 of right-handed PV module connector 106 and left-handed PV module connector 108 can then fit or hook into corresponding receiving holes 110, allowing photovoltaic module 102 to sit or balance on torque tube 104 until photovoltaic module 102 is more securely settled or attached to other components of photovoltaic array section 100. Similarly, an installer can mount fully assembled photovoltaic module 102 in the middle of torque tube 104 from the proximate side of torque tube 104, sliding fully assembled photovoltaic module 102 along leading edge ramps 120 of left-handed PV module connector 108 and right-handed PV module connector 106 up onto torque tube 104 such that collar edges 116 of both left-handed PV module connector 108 and right-handed PV module connector 106 wrap around and settle on torque tube 104. It can be understood that further photovoltaic modules 102 can be subsequently mounted onto torque tube 104, continuing with this exemplary an alternating pattern of orientation, to form longer photovoltaic array sections 100 and an overall photovoltaic array tracker.

Generally, in various embodiments, torque tube 104 can be fabricated to include receiving holes 110 (alternatively referred to as mounting holes or alignment holes) along the length of torque tube 104 so that PV module connectors (including right-handed PV module connectors 106 and left-handed PV module connectors 108, but also including other PV module connectors generally, such as brackets) may be used to attach several photovoltaic modules 102 to torque tube 104 with alternating orientations. In other embodiments, torque tube 104 can be fabricated to include receiving holes 110 along the length of torque tube 104 so that PV module connectors can be used to attach several photovoltaic modules 102 on the same side of torque tube 104.

Collar edges 116 of both right-handed PV module connectors 106 and left-handed PV module connectors 108 can be shaped to fit onto torque tube 104 such that, when mechanically coupled together, a preload tension or force between PV module connectors and torque tube 104 hold photovoltaic modules 102 in place, balanced on torque tube 104. The preload tension between collar edge 116 and torque tube 114 can be engineered according to the shape and size (e.g. width, diameter, angles, etc.) of collar edge 116 relative to the exterior surface of torque tube 104. More precisely, the size and shape of collar edge 106 can be slightly smaller than the corresponding exterior surface of torque tube 104, such that to fit onto torque tube 104, a respective PV module connector (either right-handed PV module connectors 106 or left-handed PV module connectors 108) must expand a degree past a default shape of the PV module connector so that collar edge 106 can settle onto or around a portion of torque tube 104. It can be further understood that the restoring force of each PV module connector can be translated into torque tube 104 through alignment projections 118. The preload tension between collar edge 116 and torque tube 114 can be designed to be sufficient to hold one photovoltaic module 102, or one or more photovoltaic modules 102 mechanically connected to each other, on torque tube 104, absent other external forces. Once mounted, one or more photovoltaic modules 102 can be further secured to each other or torque tube 104 in order to supplement the preload force and overall stability of photovoltaic array section 100.

Further shown is end bracket 109, positioned next to one of right-handed PV module connector 106 at one end of torque tube 104. End bracket 109 can be used optionally to aid in securing any given PV module connector at the North or South ends of photovoltaic array section 100 to torque tube 104. End bracket 109 can have a generally similar shape as right-handed PV module connectors 106 or left-handed PV module connectors 108 considered herein, optionally with or without clamping curve sections 112 and ledge sections 114. In some aspects, end brackets 109 can have flush interior and/or exterior surfaces. In other aspects, end brackets 109 can be configured to specifically terminate the ends or sides of photovoltaic array section 100. In some implementations of photovoltaic array sections 100 either right-handed PV module connectors 106 or left-handed PV module connectors 108, not supporting any photovoltaic module, can be used instead of end brackets 109.

Figure 4:
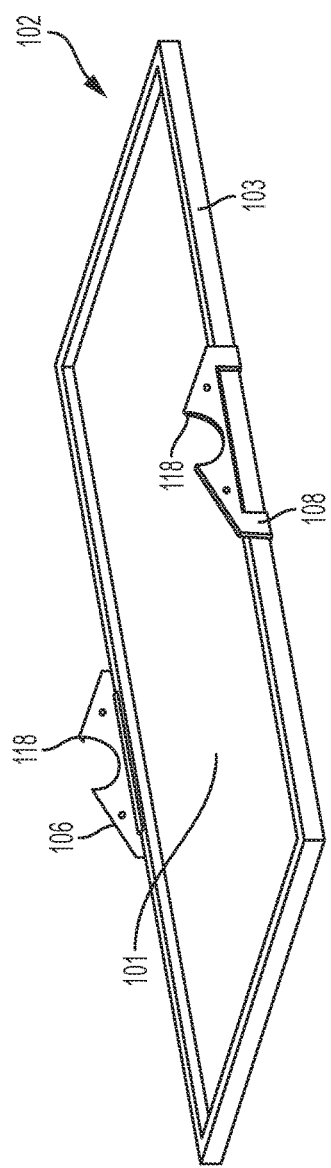
FIG. 4 shows the underside of a photovoltaic module with photovoltaic module connector mechanically coupled thereto, according to embodiments of the disclosure.

FIG. 4 shows the underside of a photovoltaic module 102 with right-handed PV module connector 106 and left-handed PV module connector 108 mechanically coupled thereto. Shown in further detail photovoltaic cells 101 arranged in a panel layout and module frame 103, holding photovoltaic cells 101 and thereby forming photovoltaic module 102. Both right-handed PV module connector 106 and left-handed PV module connector 108 have respective alignment projection 118 oriented in the same direction. In various embodiments, module frame 103 can be a standard frame with smooth edges or a frame having a structured groove therein that can allow for mechanical coupling with grooved-frame support structures. A junction box (not shown) can be electrically connected to photovoltaic cells 101 and physically attached to photovoltaic module 102 (in an appropriate orientation) when mounted onto torque tube 104.

Figure 5:
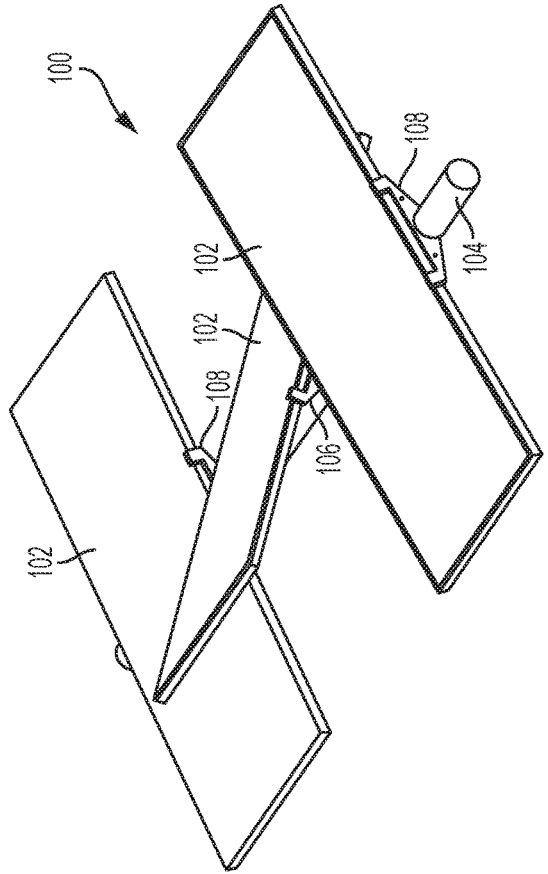
FIG. 5 shows a section of a photovoltaic array with photovoltaic modules mounted to a torque tube with photovoltaic module connectors, according to aspects of the disclosure.

FIG. 5 shows photovoltaic array section 100 of FIG. 3, with photovoltaic modules mounted to torque tube 104 with left-handed and right-handed PV module connectors. Particularly, first photovoltaic module 102 is shown mounted to torque tube 104 (in part) by one of right-handed PV module connectors 106, second photovoltaic module 102 is shown mounted to torque tube 104 (in part) by one of left-handed PV module connectors 108, and third photovoltaic module 102 is shown mounted to torque tube 104 (in part) by one of right-handed PV module connectors 106. Photovoltaic modules 102 are shown at an intermediate stage of assembly and installation, where photovoltaic modules 102 are not yet settled into a substantially even and uniform plane (similar to, but at an earlier stage of assembly than, FIG. 1A).

FIG. 6 shows a side view of PV module connectors coupled to photovoltaic module 102. In particular, the exterior face of right-handed PV module connector 106 is shown, fitted around torque tube 104 and holding photovoltaic module 102 (both shown in cross-section). A second, oppositely oriented right-handed PV module connector 106' is mostly occluded by right-handed PV module connector 106 in this view, except for a lower edge of second right-handed PV module 106' and second alignment projection 118' (where the elements of the mostly occluded structure are referred to as right-handed PV module 106' and as second alignment projection 118' in these FIGS. 6-7 for ease of identification). FIG. 6A shows a detail section of right-handed PV module connector 106 as seen in FIG. 6, further identifying alignment projection 118 extending inward into torque tube 104. On the opposite side of torque tube 104 is second alignment projection 118', which corresponds to second right-handed PV module 106' (which from the perspective of FIG. 6A is behind right-handed PV module connector 106 and thus otherwise occluded from view).

FIG. 6B shows a further detail section of leading edge aperture 122 aperture of right-handed PV module connector 106 of FIG. 6. Similarly, FIG. 6C shows a further detail section of a trailing edge aperture 124 aperture of right-handed PV module connector 106 of FIG. 6. While only the apertures of right-handed PV module connector 106 are shown in FIG. 6B and FIG. 6C, it can be appreciated that complementary apertures of second right-handed PV module 106' positioned behind right-handed PV module connector 106 can be aligned with apertures of right-handed PV module connector 106. In other words, trailing edge aperture 124 of second right-handed PV module connector 106' can be positioned in line and behind leading edge aperture 122 of right-handed PV module connector 106, and leading edge aperture 122 of second right-handed PV module connector 106' can be positioned in line and behind trailing edge aperture 124 of right-handed PV module connector 106. Seen in further detail, both leading edge aperture 122 and trailing edge aperture 124 can be formed within the main body of right-handed PV module connector 106 to be angled or offset relative to the vertical axis of right-handed PV module connector 106. The angled offset of leading edge aperture 122 and trailing edge aperture 124 provide for a structure that can apply a preload tension to physical fasteners inserted into and through either of leading edge aperture 122 and trailing edge aperture 124 of right-handed PV module connector 106, and of corresponding trailing edge aperture 124 and leading edge aperture 122 of second right-handed PV module connector 106'.

Figure 7:
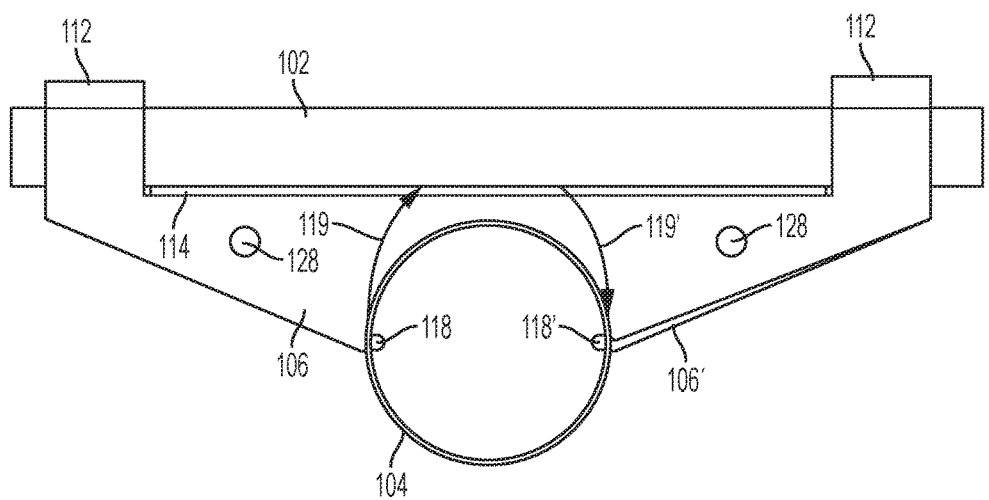
FIG. 7 shows a profile view of photovoltaic module connectors riveted together and coupled to a photovoltaic module, according to embodiments of the disclosure.

With additional reference to FIG. 3, FIG. 7 shows a side view of photovoltaic module connectors riveted together and between photovoltaic modules 102 (not shown here). As compared to FIG. 6, rivets 128 are located within both of leading edge aperture 122 and trailing edge aperture 124 of right-handed PV module connector 106. It can be appreciated that rivets 128 extend through trailing edge aperture 124 and leading edge aperture 122 of second right-handed PV module connector 106' positioned behind right-handed PV module connector 106.

Once right-handed PV module connector 106 and second right-handed PV module connector 106' are physically connected together via rivets 128, the load or weight of photovoltaic modules 102 supported in part by both of right-handed PV module connector 106 and second right-handed PV module connector 106' can be distributed via alignment projection 118 and second alignment projection 118' across both sides of torque tube 104. The distribution of the load and related sheer force of photovoltaic modules 102 on alignment projections 118 and/or second alignment projections 118' reduces the strain and wear on individual PV module connectors supporting photovoltaic modules 102 of photovoltaic array section 100. The distribution of photovoltaic module 102 load across torque tube 104 can provide for relatively greater strength and stability such that rotation of torque tube 104 can be more dynamic and quicker (for example, in response to tracking movements, stowing movements, and the like) than the rotation of torque tubes for other sections of photovoltaic arrays.

FIG. 7 further shows preload forces exerted by PV module connectors mounted onto torque tube 104. Specifically, because collar edges 116 of both right-handed PV module connector 106 and second right-handed PV module connector 106' are forcibly stretched over the outer surface of torque tube 104, both right-handed PV module connector 106 and second right-handed PV module connector 106' exert a force to torque tube 104. Because alignment projection 118 of right-handed PV module connector 106 is physically latched into torque tube 104, force 119 is tangential to torque tube 104, resulting in a clockwise moment about torque tube 104. Similarly, second alignment projection 118' of second right-handed PV module connector 106' is physically latched into torque tube 104, second force 119' is tangential to torque tube 104, resulting in a counterclockwise moment about torque tube 104. With right-handed PV module connector 106 and second right-handed PV module connector 106' paired together, and physically connected via rivets 128, force 119 and force 119' are counter-balanced, offsetting each other. In other words, moments exhibited to torque tube 104 by the forces are neutralized and in between alignment projection 118 and second alignment projection 118' (e.g. in the center of torque tube 104). The assembled condition shown here results in constant shear forces applied to rivets 128, which maintain right-handed PV module connector 106 and left-handed PV module connector 108 in position.

It can be appreciated that fastening of right-handed PV module connector 106 and second right-handed PV module connector 106' as shown in FIGS. 6-7 for the distribution of load and sheer forces from or along photovoltaic modules 102 and torque tube 104 can be equally accomplished with pairs of left-handed PV module connectors 108 mechanically supporting photovoltaic modules 102 on opposite sides of photovoltaic modules 102 from respective right-handed PV module connectors 106. Thus, along the length of photovoltaic array section 100, adjacent photovoltaic modules 102 can be supported by paired right-handed PV module connectors 106 or paired left-handed PV module connectors 108, where the type of paired PV module connectors on any given side of photovoltaic module 102 alternates along the length of photovoltaic array section 100 (corresponding to the orientation of photovoltaic module 102 mounted onto torque tube 104).

In alternative embodiments, two or more adjacent photovoltaic modules 102 may be mounted onto torque tube 104 in the same orientation, from the same side of torque tube 104. Such an installation variation may be necessitated by the environment, geography, or construction of photovoltaic array section 100. In such embodiments, support of adjacent photovoltaic modules 102 on torque tube can be accomplished by pairing and fastening right-handed PV module connector 106 of one photovoltaic module 102 with left-handed PV module connectors 108 of adjacent photovoltaic module 102. Along the full length of photovoltaic array section 100, distribution of load and forces can maintain a stable and supported structure, at least for a localized region of photovoltaic modules 102 oriented and mounted in the same direction.

Figure 8A:
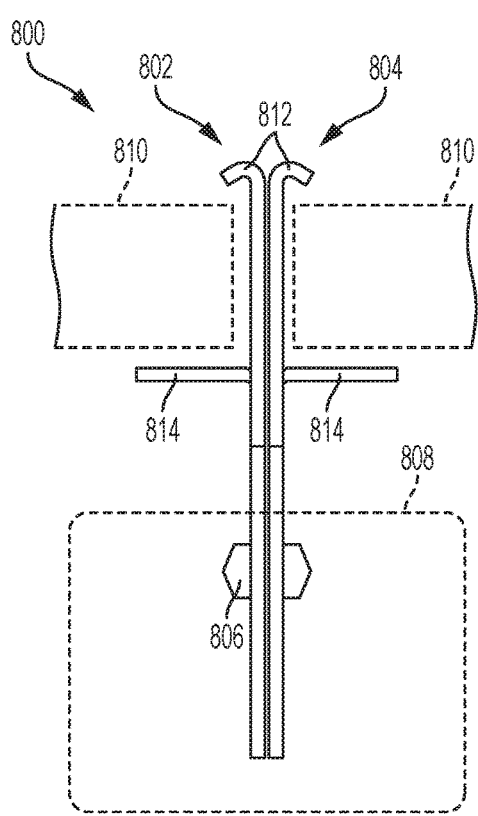
FIG. 8A shows a schematic side view representation of two module brackets riveted together, where the module brackets can be photovoltaic module connectors, according to aspects of the disclosure.

FIG. 8A shows a schematic representation of two module brackets physically fastened together 800. First module bracket 802 is positioned with an interior face directed toward supported structure 810 (where in some embodiments supported structure 810 can be a photovoltaic module). Second module bracket 804 is positioned with an interior face directed toward supported structure 810 in an opposite direction relative to first module bracket 802. Accordingly, exterior faces of both first module bracket 802 and second module bracket 804 face each other. Fastener 806 passes through and mechanically couples first module bracket 802 and second module bracket 804 together. Fastener 806 is biased toward the lower half of both first module bracket 802 and second module bracket 804, where both first module bracket 802 and second module bracket 804 are configured to fit over and physically attach to support bar 808 (where in some embodiments support bar 808 can be a torque tube). Both of first module bracket 802 and second module bracket 804 can have resting platform 814 on which supported structure 810 can sit. Both of first module bracket 802 and second module bracket 804 can further have gripping contour 812 that, paired with resting platform 814, can mechanically hold, grasp, or support supported structure 810. Gripping contour 812 and resting platform 814 can be both biased toward the upper half of both first module bracket 802 and second module bracket 804, such that one or more supported structures 810 can be held at an elevation relatively above support bar 808.

In various aspects, fastener 806 can be a rivet, a screw, a bolt, or other suitable physical fastener having sufficient length to span a distance between first module bracket 802 and second module bracket 804. In various aspects, first module bracket 802 and second module bracket 804 can be from about one quarter of an inch (¼ in.) to about six inches (6 in.) distant from each other, or at increments or gradients of distance thereof. In many aspects, fastener 806 will secure first module bracket 802 and second module bracket 804 such that first module bracket 802 and second module bracket 804 are abutting and in physical contact with each other.

Figure 8B:
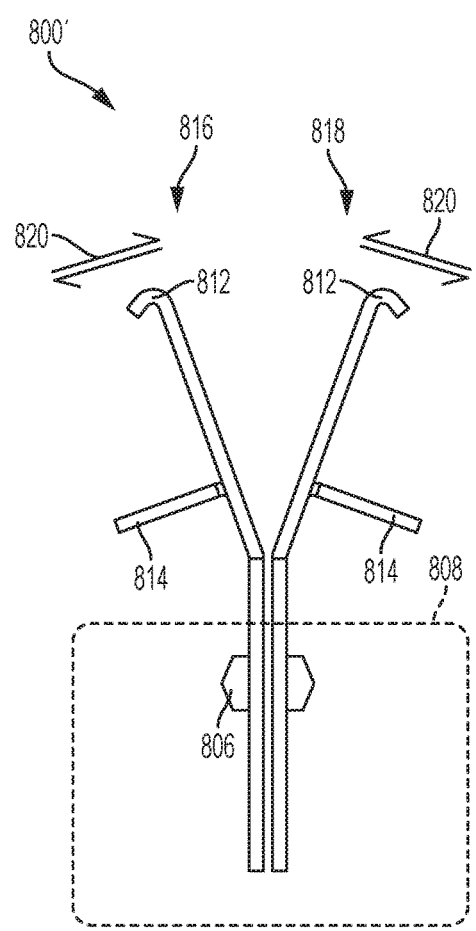
FIG. 8B shows a schematic side view representation of an alternative embodiment of two module brackets riveted together, where the module brackets can be photovoltaic module connectors, according to aspects of the disclosure.

FIG. 8B shows a schematic representation of an alternative embodiment of two module brackets physically fastened together 800'. First angled-module bracket 816 is positioned with an interior face directed toward supported structure

810. Second angled-module bracket 818 is positioned with an interior face directed toward supported structure 810 in an opposite direction relative to first angled-module bracket 816. Accordingly, exterior faces of both first angled-module bracket 816 and second angled-module bracket 818 face each other. Fastener 806 passes through and mechanically couples first angled-module bracket 816 and second angled-module bracket 818 together. Fastener 806 is biased toward the lower half of both first angled-module bracket 816 and second angled-module bracket 818, where both first angled-module bracket 816 and second angled-module bracket 818 are configured to fit over and physically attach to support bar 808. Both of first angled-module bracket 816 and second angled-module bracket 818 can have resting platform 814 on which supported structure 810 can sit. Both of first angled-module bracket 816 and second angled-module bracket 818 can further have gripping contour 812 that, paired with resting platform 814, can mechanically hold, grasp, or support supported structure 810. Gripping contour 812 and resting platform 814 can be both biased toward the upper half of both first angled-module bracket 816 and second angled-module bracket 818, such that one or more supported structures 810 can be held at an elevation relatively above support bar 808.

First angled-module bracket 816 and second angled-module bracket 818 are formed having their upper portions acutely angled toward the interior surface of each bracket. Accordingly, two module brackets physically fastened together 800' as shown have a thermal expansion jog 820, where when either or both of first angled-module bracket 816 and second angled-module bracket 818 are fastened together and exposed to heat (such as when supporting photovoltaic modules under sunlight) the upper portions of both first angled-module bracket 816 and second angled-module bracket 818 can expand to a relatively straightened position, or even to an obtusely angled position, without the exterior sides of first angled-module bracket 816 and second angled-module bracket 818 physically contacting or conflicting with each other. As shown, the angle at which upper portions of first angled-module bracket 816 and second angled-module bracket 818 are acutely angled is slightly exaggerated for illustrative purposes. In various aspects, first angled-module bracket 816 can be angled toward an interior surface of first angled-module bracket 816 away from a vertical axis by about one to ten degrees ($\theta=1°-10°$). Similarly, in various aspects, second angled-module bracket 818 can be angled toward an interior surface of second angled-module bracket 818 away from a vertical axis by about one to ten degrees ($\theta=1°-10°$).

In alternative embodiments, first module bracket 802 and second module bracket 804, or first angled-module bracket 816 and second angled-module bracket 818, can be connected to each other, respectively, without a fastener. For example, first module bracket 802 can include a further projection that can couple with a further receiving structure in second module bracket 804, or vice versa. Similarly, first angled-module bracket 816 can include a further projection that can couple with a further receiving structure in second angled-module bracket 818, or vice versa. The physical connection between either first module bracket 802 and second module bracket 804, or first angled-module bracket 816 and second angled-module bracket 818, need only be sufficient to distribute the load of support structures 810 and to offset or balance any preload tension generated by coupling to support bar 808.

Figure 9:
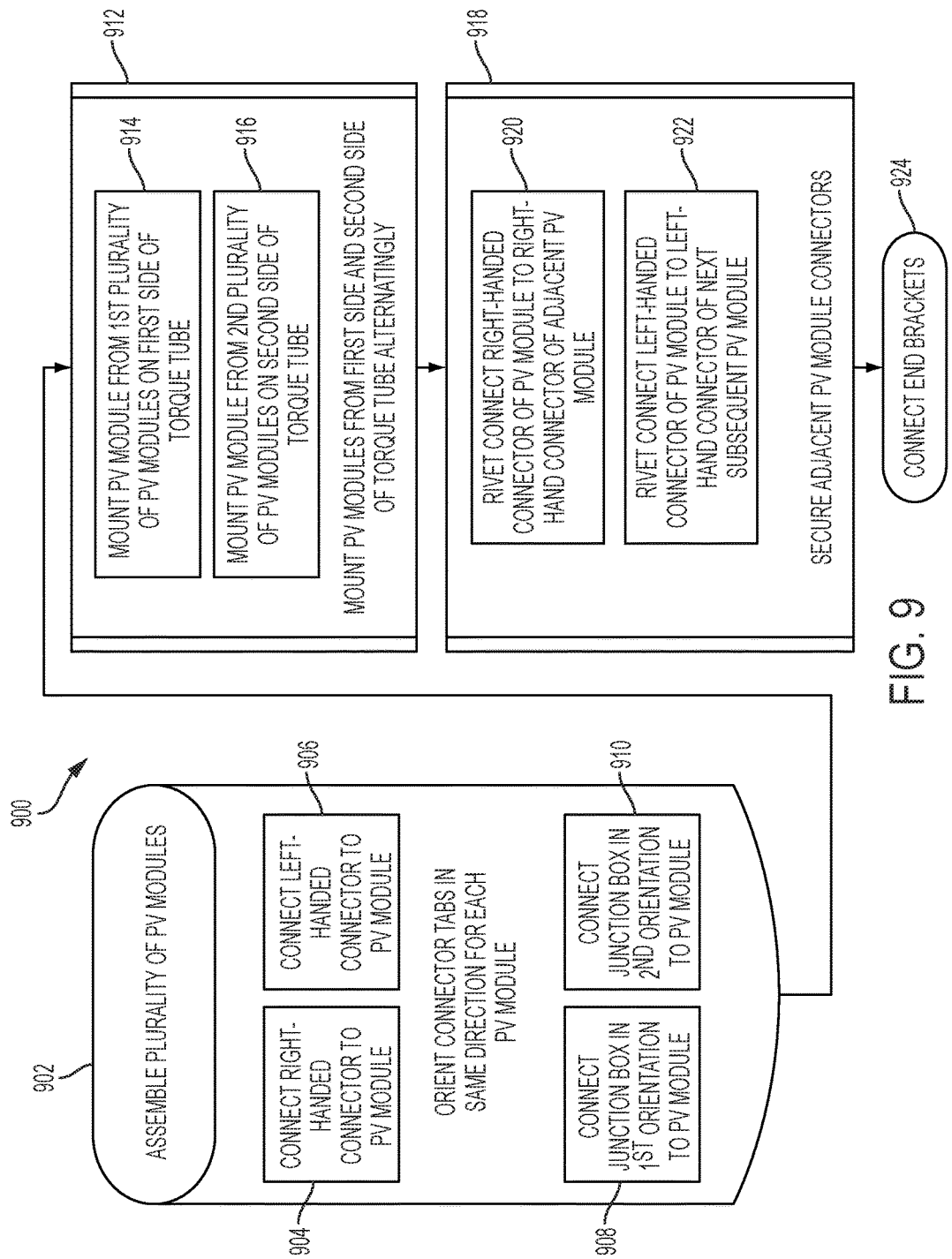
FIG. 9 shows an exemplary flowchart describing a method of assembling a photovoltaic array, according to embodiments of the disclosure.

FIG. 9 shows an exemplary flowchart 900 describing a method of assembling a photovoltaic array. At step 902, a plurality of PV modules are assembled. Assembly of each PV module includes step 904, connecting a right-handed connector to the PV module and step 906, connecting a left-handed connector to the PV module. Both of the right-handed connector and the left-handed connector are oriented such that attachment tabs on each connector are pointing in the same direction on a given PV module. Assembly of the plurality of PV modules further includes connecting a junction box to the underside of each PV module, at step 908 with a first portion of the plurality of PV modules having the junction box connected in a first orientation, and at step 910 with a second portion of the plurality of PV modules having the junction box connected in a second orientation, opposite of the first junction box orientation.

At step 912, PV modules are then placed on the torque tube with the torque tube rotated to an orientation such that when correctly placed the modules will sit substantially perpendicular to the ground. The PV modules are placed in alternating fashion, at step 914 with PV modules from the first plurality of PV modules mounted onto the torque tube from a first side of the torque tube, and at step 916 with PV modules from the second plurality of PV modules mounted onto the torque tube from a second side of the torque tube. Each PV module is pivoted in at an angle and pressed down to such that the collar portion of the PV module connectors rest and frictionally interface with the torque tube, and such that attachment tabs insert or hook into orientation holes in the torque tube. The next PV module (from the other plurality of PV modules) is placed on the torque tube in the same manner, and so on until all modules have been attached to the torque tube sufficient to form a section of a photovoltaic array. The PV modules connectors may have a timing mark or other feature to inform the installer as to the desired position of the PV module with respect to torque tube so that all PV modules are attached to the torque along the same generally uniform plane for photovoltaic cells of the PV modules.

Regardless of whether an initially mounted PV module is selected from first plurality of PV modules or the second plurality of PV modules, the PV modules are mounted in an alternating order. An installer can use the torque tube as a pivot on which to rest the weight of the PV module, held in place by collar portions of the right-handed and left-handed connectors while the PV modules balance on the torque tube.

At step 918, PV module connectors are secured to each other as the photovoltaic modules are mounted on a torque tube. At step 920, adjacent right-handed PV module connectors (in other words, PV module connectors connected to different and subsequent PV modules, but physically proximate or next to each other) are riveted together. At step 922, adjacent left-handed PV module connectors (in other words, PV module connectors connected to different and subsequent PV modules, but physically proximate or next to each other) are riveted together. It can be appreciated that PV module connectors do not necessarily have to be riveted together, but can be otherwise physically fastened and secured to each other. It can be further appreciated that the order of step 920 and step 922 as performed within step 918 is guided by the orientation of the photovoltaic modules as arranged on torque tube 104. Indeed, in various alternative aspects, step 920 and step 922 can be performed in a sequential, reversed, repeating, patterned, or irregular order, as necessary or optimal for installation of any given set of photovoltaic modules for a photovoltaic tracker array section.

Disconnection of a photovoltaic array assembled according to the disclosed method can include simply cutting the rivet or removing the other mechanical fastener connecting PV module connectors to each other, disengaging tabs for each PV module from holes in the torque tube, and sliding the PV modules off of the torque tube.

In addition to tracker arrays, the brackets and/or clamps as disclosed herein can also be used for mounting PV modules in other types of PV installations, for example in fixed arrays. Such fixed arrays can include fixed tilt ground-based or roof-top mounting systems, where such systems can have individual or common tubular members to which the brackets and/or clamps can be used to attach PV modules.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic module connector system for a solar tracker array comprising:
    a first connector comprising:
        a first ledge section extending from an interior surface of the first connector and having a support surface configured to contact and support a first side of a first photovoltaic module;
        a first collar edge of the interior surface of the first connector configured to fit around and mount to a torque tube; and
        a first alignment projection extending from and integrally formed with the first collar edge of the first connector in a first direction, wherein the first alignment projection is configured to extend into the torque tube in the first direction parallel to the support surface of the first ledge section when the first collar edge of the first connector is mounted to the torque tube; and
    a second connector comprising:
        a second ledge section extending from an interior surface of the second connector and configured to support a second side of the first photovoltaic module;
        a second collar edge of the interior surface of the second connector configured to fit around and mount to the torque tube; and
        a second alignment projection extending from the second collar edge of the second connector, wherein the second alignment projection is configured to extend into the torque tube in the first direction when the second collar edge of the second connector is mounted to the torque tube;
    wherein the first connector and the second connector are configured to be positioned in a first configuration with the first connector and the second connector mounted to the torque tube and supporting the first photovoltaic module from opposite sides of the first photovoltaic module with the first and second alignment projections extending in the first direction into the torque tube,
    wherein in the first configuration the first connector is configured to be connected to a third connector, identical to the first connector, with the interior surfaces of the first and third connectors facing away from each other so that first alignment projections of the first and third connectors extend in opposite directions parallel to the support surface of the first ledge section toward each other and extend into opposite sides of the torque tube; and
    wherein in the first configuration the second connector is configured to be connected to a fourth connector, identical to the second connector, with the interior surfaces of the second and fourth connectors facing away from each other so that second alignment projections of the second and fourth connectors extend parallel to the support surface of the first ledge section in opposite directions toward each other and extend into opposite sides of the torque tube.

2. The photovoltaic module connector system of claim 1, wherein the first connector and the second connector each further comprise:
    at least one clamping curve section, extending from the interior surface;
    a leading edge aperture passing through the interior surface; and
    a trailing edge aperture passing through the interior surface.

3. The photovoltaic module connector system of claim 1, wherein the first connector is configured to be riveted to the third connector.

4. The photovoltaic module connector system of claim 2, wherein the first connector further comprises a leading edge ramp positioned below the leading edge aperture, the leading edge ramp being contiguous with the first alignment projection.

5. The photovoltaic module connector system of claim 2, wherein the first connector further comprises a trailing edge ramp positioned below the trailing edge aperture.

6. The photovoltaic module connector system of claim 1, wherein the first connector is configured to apply counter balanced moments to the torque tube with the third connector.

7. A photovoltaic tracker array section, comprising:
a torque tube;
a first photovoltaic module mounted on the torque tube via a first pair of photovoltaic module connectors; and
a second photovoltaic module mounted on the torque tube via a second pair of photovoltaic module connectors,
wherein each photovoltaic module connector of the first pair of photovoltaic module connectors further comprises a first collar and a first attachment tab integrally formed with the first collar and mechanically coupling with a respective aperture of a plurality of first apertures on a first side of the torque tube, each aperture of the plurality of first apertures being positioned at a first radial angle relative to a longitudinal axis of the torque tube,
wherein each photovoltaic module connector of the second pair of photovoltaic module connectors further comprises a second collar and a second attachment tab integrally formed with the second collar and mechanically coupling with a respective aperture of a plurality of second apertures positioned at a second radial angle relative to the longitudinal axis of the torque tube, radially offset from the first radial angle and on a second side of the torque tube opposite the first side of the torque tube so that each of the first attachment tabs extends into the torque tube and toward one of the second attachment tabs.

8. The photovoltaic tracker array section of claim 7, further comprising fasteners connecting a photovoltaic module connector of the first photovoltaic module to a photovoltaic module connector of a member of the second photovoltaic module.

9. The photovoltaic tracker array section of claim 7, wherein the plurality of first apertures are radially offset 180 degrees from respective ones of the plurality of second apertures relative to the longitudinal axis of the torque tube.

10. The photovoltaic tracker array section of claim 7, wherein each photovoltaic module connector of the first pair of photovoltaic module connectors comprises:
a ledge section protruding from an interior surface of the photovoltaic module connector, the ledge section comprising a support surface which contacts and supports a first side of the first photovoltaic module.

* * * * *